(12) United States Patent
Kaplan et al.

(10) Patent No.: US 8,400,926 B2
(45) Date of Patent: *Mar. 19, 2013

(54) MULTI-PROTOCOL TELECOMMUNICATIONS ROUTING OPTIMIZATION

(75) Inventors: Allen D. Kaplan, Miami Beach, FL (US); William F. McCarthy, Erie, PA (US)

(73) Assignee: Patentmarks Portfolio, LLC, Arlington, VA (US)

( * ) Notice: Subject to any disclaimer, the term of this patent is extended or adjusted under 35 U.S.C. 154(b) by 1478 days.

This patent is subject to a terminal disclaimer.

(21) Appl. No.: 11/948,746

(22) Filed: Nov. 30, 2007

(65) Prior Publication Data

US 2008/0225832 A1    Sep. 18, 2008

Related U.S. Application Data

(63) Continuation of application No. 10/157,611, filed on May 29, 2002, now Pat. No. 7,307,956, which is a continuation of application No. 09/665,399, filed on Sep. 20, 2000, now Pat. No. 6,473,404, which is a continuation of application No. 09/198,687, filed on Nov. 24, 1998, now Pat. No. 6,144,641, which is a continuation of application No. 08/741,130, filed on Oct. 31, 1996, now Pat. No. 6,016,307.

(51) Int. Cl.
*H04L 12/28* (2006.01)

(52) U.S. Cl. .......................... 370/238; 370/252; 370/465

(58) Field of Classification Search .......... 370/229–230, 370/232–233, 235, 237–238, 250, 252, 253, 370/351–356, 465–467; 379/219, 220.01, 379/221.01, 221.05, 242–343
See application file for complete search history.

(56) References Cited

U.S. PATENT DOCUMENTS

| | | | | |
|---|---|---|---|---|
| 5,251,209 A * | 10/1993 | Jurkevich et al. | ............. | 370/468 |
| 6,011,804 A * | 1/2000 | Bertin et al. | ................... | 370/468 |
| 6,016,307 A * | 1/2000 | Kaplan et al. | ................... | 370/238 |
| 6,208,622 B1 * | 3/2001 | Makrucki | ...................... | 370/252 |
| 6,314,093 B1 * | 11/2001 | Mann et al. | .................... | 370/351 |
| 6,331,986 B1 * | 12/2001 | Mitra et al. | .................... | 370/468 |
| 6,347,091 B1 * | 2/2002 | Wallentin et al. | .............. | 370/437 |
| 6,400,681 B1 * | 6/2002 | Bertin et al. | .................... | 370/218 |
| 6,542,468 B1 * | 4/2003 | Hatakeyama | ................. | 370/238 |
| 6,788,646 B1 * | 9/2004 | Fodor et al. | .................... | 370/230 |
| 6,912,232 B1 * | 6/2005 | Duffield et al. | ............... | 370/468 |
| 7,307,956 B2 * | 12/2007 | Kaplan et al. | ................. | 370/238 |

* cited by examiner

*Primary Examiner* — Kevin Mew
(74) *Attorney, Agent, or Firm* — Hershkovitz & Associates LLC; Abe Hershkovitz

(57) ABSTRACT

A telecommunications switching system employing multi-protocol routing optimization which utilizes predetermined and measured parameters in accordance with a set of user priorities in determining the selection of a telecommunications path to be utilized for transmitting a data file to a remote destination. The switching system has a first memory for storing the data file to be transferred, a second memory for storing predetermined parameters such as cost data associated with each of the telecommunications paths, a third memory for storing a set of user priorities regarding the transmission of data files, and means for measuring the value of variable parameters such as file transfer speed associated with each of the telecommunications paths.

24 Claims, 2 Drawing Sheets

MULTI-PROTOCOL TELECOMMUNICATIONS ROUTING OPTIMIZATION

RELATED APPLICATIONS

This application is a continuation of U.S. patent application Ser. No. 10/157,611, filed May 29, 2002, which is a continuation of U.S. patent application Ser. No. 09/665,399, filed Sep. 20, 2000, now U.S. Pat. No. 6,473,404, issued Oct. 10, 2002, which is a continuation of U.S. patent application Ser. No. 09/198,687, filed Nov. 24, 1998, now U.S. Pat. No. 6,144,641, issued Oct. 20, 2000, which is a continuation of U.S. patent application Ser. No. 08/741,130, filed Oct. 31, 1996, now U.S. Pat. No. 6,016,307, issued Jan. 18, 2000. The subject matter of each of these patent applications and/or patents is hereby incorporated by reference herein in their entireties.

BACKGROUND OF THE INVENTION

This invention relates to telecommunications, and in particular to a method and apparatus for dynamically selecting an optimal telecommunications path from a plurality of available paths in accordance with an analysis of both static and dynamically changing variables and user priorities.

The telecommunications industry has changed rapidly in recent times from the simple analog connection of telephones for voice communications to the present systems for transmitting and receiving data, facsimile, e-mail, video, audio, as well as voice in both analog and digital formats (referred to herein collectively as data). Data may be transmitted in any of various formats, such as a data file, data packets, encapsulated packets, or data streams (referred to herein as a data file). Various types of telecommunications systems have been and continue to be installed, which function as the backbone systems for transmission of data over numerous media. For example, data may be transmitted from one user to another by POTS (plain old telephone system), leased lines, mobile cellular networks, digital links, fiber optics, satellite links, and private and public packet switching networks such as the Internet.

In addition, there exists a great amount of pricing competition among service providers employing various types of these transmission media. For example, so-called long distance service providers such as AT&T and MCI offer rates in competition with each other in order to gain greater market shares of consumer, business, non-profit organizations, and governmental users. As a result of the numerous types of communications services available, as well as the competition between providers of these services, users are often faced with difficult choices regarding the selection of a service which will provide them with the best value.

Often, more than one communications service providers are available at a given time to a user for selection as a carrier of the data to be transmitted. For example, a user may subscribe to two or more long distance service providers, and may access either one a given time by first dialing the service provider's code, and then dialing the destination phone number. In addition, a user may have various types of media available for selection; i.e. the connection may be made via the Internet, satellite, etc. This is especially true in a business environment, where economic considerations allow numerous communications resources to be available for use.

The prior art generally recognizes low cost as being the factor upon which routing decisions are made for the transmission of data. As such, so-called "least cost routing" facilities proliferate, allowing a call to be placed with a service provider that provides the least cost a given time. PBX (private branch exchange) systems may employ such a least cost routing facility that automatically connects the calling party to the destination number along the cheapest route available.

The present invention recognizes that the best value for a communications medium at a given time is not necessarily the lowest cost of the choices available. That is, the optimization of routing selection encompasses not only a low cost, but also takes into account other factors such as transmission bandwidth of the medium, its availability at the specific time the user needs to use it, its security, and its reliability. In addition, a user's priorities may change from time to time, and the requirements regarding the transmission of one data file may be different than the requirements of another file. That is, a user may want to transmit one file in an emergency situation at the fastest speed, regardless of its cost. Other files may need high security from being illicitly intercepted, and yet other files may only need to be transmitted at the lowest cost at any time in the near future, with no speed concerns.

Thus, the present invention recognizes that the selection of the optimal route for data transmission at a given time is a dynamic analysis that must be done in real-time, and must take into account various factors regarding the available media as well as the priorities of the user and of the file to be transmitted.

U.S. Pat. No. 5,337,352 discloses a PBX system servicing a plurality of tenants, wherein each tenant may specify which of a plurality of routes should be selected as having the highest priority, then second highest priority, etc. The routing selections are predetermined by each tenant in accordance with their requirements and available resources, and the selections are stored in a table in the PBX. Once a tenant desires to place a call, the PBX looks in the table to determine the highest priority route for that particular tenant, and connects the call accordingly. If that route is not available, then the next priority route, according to the predetermined tenant table, is connected. Thus, a predetermined pecking order is established by each tenant and stored in the PBX. This system is static and not changeable on a real-time basis since each tenant must predetermine the priority of specific providers to utilize. Although the system of this patent checks the availability of the highest predetermined priority route and uses the next highest priority if it is unavailable, such analysis is only a discrete yes/no inquiry and does not take into account the current amount of traffic over the route to analyze the route's availability on a relative basis.

It is therefore an object of the present invention to overcome the shortcomings of the prior art systems as described above.

It is an object of the present invention to provide a system and method for selecting an optimal communications path for connecting a call to a remote location for the transfer of a data file thereover by analyzing on a real-time basis a set of multiple protocols.

It is a further object of the present invention to provide such a system and method for multi-protocol route optimization which analyzes the priorities of a user regarding the transmission of a particular data file in determining the optimal route for the call.

It is an even further object of the present invention to provide such a system and method for multi-protocol route optimization which analyzes various factors regarding the route on a real-time basis in determining the optimal route for the call.

It is an even further object of the present invention to provide such a system and method for multi-protocol route optimization which allows a user to override preset default values and specify critical transfer parameters on a file-by-file basis.

SUMMARY OF THE INVENTION

In accordance with these and other objects, provided is a communications switching system comprising a first memory for holding a data file to be transferred to a remote destination and a plurality of interfaces coupled with the first memory, wherein each of the interfaces is interconnected with an associated telecommunications path capable of transferring the data file to the remote destination. The switching system comprises a second memory for storing predetermined parameters associated with each of the telecommunications paths and means for measuring the value of variable parameters associated with each of the telecommunications paths. A third memory stores a set of user priorities regarding the transmission of data files. Processor means is operatively associated with the second and third memories and the variable parameter measuring means for determining which of the plurality of telecommunications paths should be utilized for transferring the data file in accordance with the set of user priorities, the predetermined communications path parameters, and the measured variable parameters. The switching system further comprises input means for allowing a user to change the user priorities in the third memory prior to transmitting a file.

For example, the variable parameter measuring means performs a measurement of the data transfer speed of each of the communications paths, for example by a so-called ping test. The predetermined parameters stored in the second memory comprises the cost per unit time of utilizing each of the communications paths, which may be a function of the current time of day and/or current day of week. The predetermined parameters stored in the second memory also comprises a measure of data transfer reliability of each of the paths as well as a measure of data transfer bandwidth of each of the paths. The switching system may also comprise means for ascertaining if an interface is available for data file transfer at a particular time.

In a method aspect utilizing the switching system of the present invention, provided is a method of determining which of a plurality of communications paths should be utilized for transferring a data file in accordance with a set of user priorities, the method comprising the steps of measuring variable parameters for each of said paths, analyzing the measured variable parameters and the predetermined parameters in relation to the user priorities; and determining which of the paths provides the characteristics desired by the user for transferring the file in accordance with the user's priorities.

DETAILED DESCRIPTION OF THE PREFERRED EMBODIMENT

Figure 1:
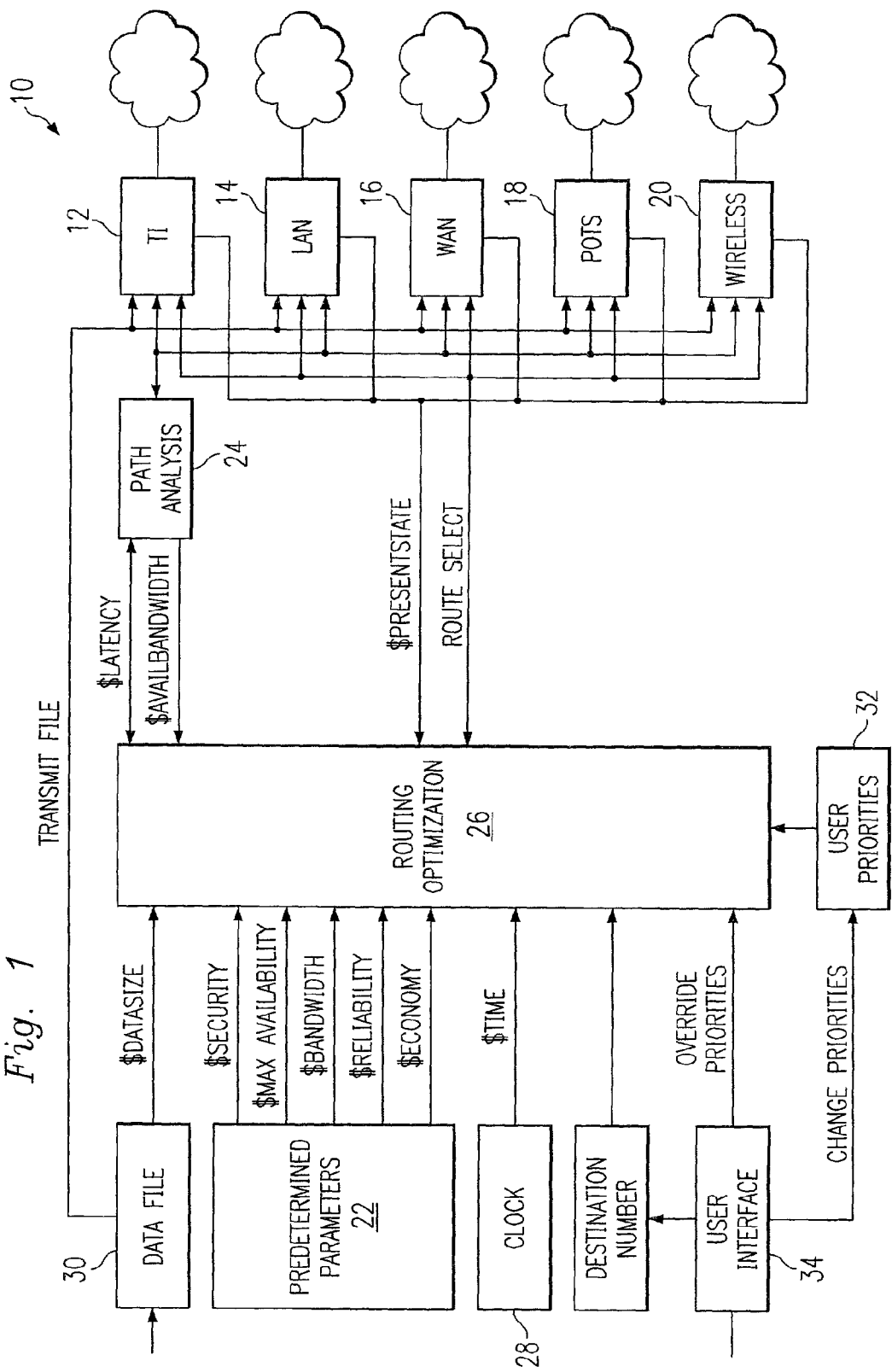
FIG. 1 is a functional block diagram of the switching system of the present invention utilizing multi-protocol routing optimization.

FIG. 1 illustrates a block diagram of the telecommunications switching system 10 of the present invention, which may be implemented for example on a personal computer platform, personal digital assistant (PDA), dedicated system such as a PBX, or the like. The switching system 10 is connected to various communications media in accordance with the user's resources. In particular, the switching system 10 may be configured to a high speed digital link via a T1 interface 12, to a local area network (LAN) via LAN interface 14, to a wide area network (WAN) via a WAN interface 16, to a local loop in a plain old telephone system (POTS) via POTS interface 18, and to a wireless communication network via wireless interface 20. The interfaces 12, 14, 16, 18 and 20 are exemplary and are provided for the purposes of illustrating the preferred embodiment of the present invention. Thus, in practice, any number of the aforementioned interfaces may be used alone or in any combination as required by the user. For example, a number of common carriers such as MCI, AT&T and SPRINT may be configured to the switching system 10 such that the user may take advantage of the relative benefits of each carrier via the multi-protocol routing optimization to be described herein. In addition, the wireless interface 20 may be configured for communications by any type of wireless communications such as infrared, radio frequency, optical, etc.

Each of the telecommunication media connected to the various interfaces of FIG. 1 has certain parameters associated therewith which are implemented by the routing methodology of the present invention. These parameters are classified by the routing methodology as being either predetermined (fixed) or measurable (variable). Data regarding the predetermined parameters are stored in a memory 22 in the switching system 10, while data regarding the measurable parameters must be collected by path analysis block 24 from each interface in real-time at or about the time the data file is transferred in order for the routing methodology to make a proper analysis.

Predetermined parameters stored in memory 32 include, but are not limited to, the following:

TABLE A

| | |
|---|---|
| $maxbandwidth (i): | the maximum amount of bandwidth available for interface (i). For example, a 28.8 kbs modem would have a $maxbandwidth variable set to 28.8. |
| $reliability (i): | an indication of the reliability of interface (i) according to the following scale: 10 = non-reliable transfer (e.g. wireless) 50 = moderately reliable (e.g. modem) 75 = very reliable (e.g. T1, WAN) 100 = ultra reliable (e.g. Ethernet LAN) |
| $economy (i): | the currency expenditure of interface (i) for a period of time, normalized so that a high cost interface yields a low measure of economy: $economy (i) = 100 − cost/minute |
| $availability (i) | the availability of interface (i) to a particular user. Not all users of the system will have access to each interface; e.g. in a shared PBX environment only certain subscribers may have access to the T1 interface. $availability = 0 Not available $availability = 1 Available |
| $security (i) | an indication of the relative data security of the path, which may example be a function of the number of bits in an encryption key (e.g. 1024) |

Measurable parameters include, but are not limited to the following:

TABLE B

| | |
|---|---|
| $presentstate (i) | the present state of interface (i), indicating if the telecommunications path is presently operational. $presentstate = 0 Not operational $presentstate = 1 Operational |
| $avgstate (i) | average of $presentstate (i) over prior five minute window |
| $datasize (i) | the size in KB of the data file to be transmitted. |
| $latency (i) | measure in msec of delay through path (i). This is based on a real-time test on the interface such as by a so-called ping to the remote host. |
| $time | time of day/day of week; this is the same for all interfaces. |
| $availbandwidth (i) | available bandwidth of interface (i) at a given time of file transfer |

Rather than simply relying on preprogrammed "least cost" routing criteria, the present invention utilizes all or a logical subset of the variables set forth in the Tables A and B above to arrive at a routing decision for a data file to be transmitted. That is, by employing the multi-protocol routing optimization of the present invention, the path chosen for transmission of a data file takes into account parameters which vary in real-time, thus not relying on a simple preprogrammed look-up table of low cost providers as in the prior art. In addition, the user can specify his priorities as to the parameters which are critical in transmitting a particular file, i.e. low cost, high speed, reliability, security, etc., in making the routing determination.

The methodology employed by the present invention is processed by routing optimization block 26 (which may be implemented in a microprocessor) and utilizes two main components comprising the parameters set forth in the Tables A and B above in varying combinations. The first component is a measure of an inherent efficiency and desirability of a particular telecommunications path, and is given by the following equation:

$$\$prevalue(i) = \$maxbandwidth(i) + \$reliability(i) + \$economy(i) + \$security(i) \quad (1)$$

The variable $prevalue is a linear value that increases with a high bandwidth, a high reliability, a high measure of economy (low cost) and/or a high degree of security of a particular path. This variable is essentially unchanging for a given path, except for the fact that the $economy parameter is based in part on the $time variable (cost of the path is a function of the time of day/day of week) which is derived from a real-time clock 28.

The second component utilized by the routing methodology of the present invention is based in part upon real-time parameters that may exhibit a wide variance due to numerous reasons, some of which may be beyond the control of the user:

$$\$currentvalue(i) = \$economy(i) \times \$speed(i) + \$avgstate(i) \times 10 \quad (2)$$

where $speed(i)=10,000−($datasize(i)×$latency(i)×100) so that:

$$\$currentvalue(i) = \$economy(i) \times (10{,}000 - (\$datasize(i) \times \$latency(i) \times 100) + \$avgstate(i) \times 10$$

Thus, the $currentvalue(i) for a given path (i) will be higher for the path having a greater economy (low cost), a low data file size, and/or little latency through the path (high speed).

The selection of the optimal route to use is then a combination of the values calculated above in equations (1) and (2):

$$\$finalvalue(i) = \$prevalue(i) + \$currentvalue(i) \quad (3)$$

$$= \$maxbandwidth(i) + \$reliability(i) +$$

$$\$economy(i) + \$security(i) + (\$economy(i) \times$$

$$(10{,}000 - (\$datasize(i) \times \$latency(i) \times$$

$$100) + \$avgstate(i) \times -10)$$

The routing optimization methodology block 26 then takes the highest $finalvalue(i) for each path in the system that is available, operational, and meets a threshold ($avgstate×10) value of 25 or above as shown in the flowcharts to be described below. This methodology thereby allows the optimal selection based on an analysis of multiple protocols employed by the system, rather than simply a least cost routing decision.

Path analysis function block 24 obtains the value $latency (i) for each path(i) by any means known in the art for obtaining the latency of an IP addressable path, such as by well known software utility known as "ping." The ping routine sends a packet onto the network and obtains a value of the average delay encountered by that packet in reaching the destination and returning. Other techniques which allow the system to obtain a measure of the latency of the path are also encompassed by the present invention.

A user may customize the relative weights given to each of the variables set forth in Tables A, B in accordance with his specific requirements as stored in user priorities memory 32. These fixed weighting values would be stored in a memory in the switching system and used in conjunction with the routing methodology for all files transferred in accordance with the invention. The weighting values are used as multipliers for the variables in the algorithm in order to allow the user to customize the algorithm as desired. For example, a user may want to emphasize the $security(i) parameter in the analysis, and may then specify a weight multiplier of (for example) two so that the $security(i) parameter is weighted twice as much as if the $security(i) parameter were left in the default state.

In addition, a user may override via input to a user interface 34 the fixed parameter weights preprogrammed in memory for any given file transfer with temporary values. The user interface may be any type of device for allowing the user to input data, such as a keyboard, mouse, etc.

In another form of parameter weighting, the user may also force the program to ignore certain parameters and focus on one parameter only in arriving at a routing decision. For example, if a user wants to transmit a data file 30 to a remote location via the fastest path, regardless of cost or any other factor, then the user specifies this requirement to the routing optimization block 26 via the interface 34. The routing optimization block 26 will then cause all variables except for $latency to a predetermined factor, so that the path with the smallest value for $latency (i.e. the smallest routing delay) will be chosen by the routing optimization block 26 as being the fastest route.

Other permutations and variations of the above example can be easily derived by one skilled in the art to allow the user to specify his priorities as to data transfer of a file at any given point in time, e.g. the analysis may be forced to look at any two variables, etc.

In addition, a user may store certain sets of parameter weighting to be used in different situations, and then select the set when desired. The set of weights would then be applied as above described. Furthermore, the program may be configured to automatically apply certain weighting sets as a function of the data type. For example, the user may specify that all facsimile messages be given a high economy factor, while all video files be given a low security factor, etc.

Figure 2:
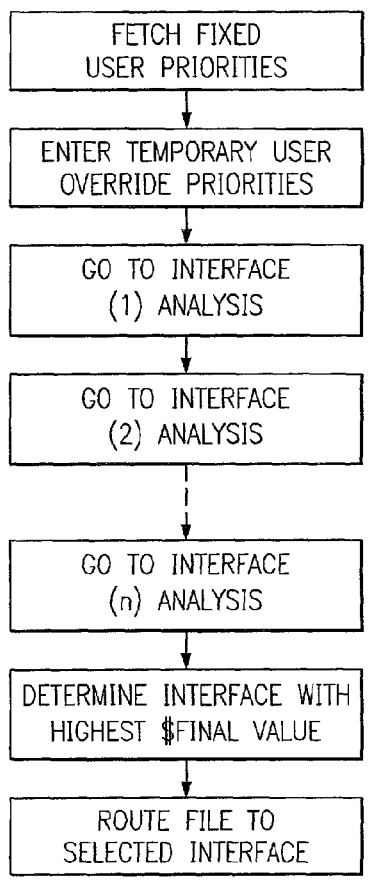
FIG. 2 is a flowchart of the main routine carried out by the present invention.
Figure 3:
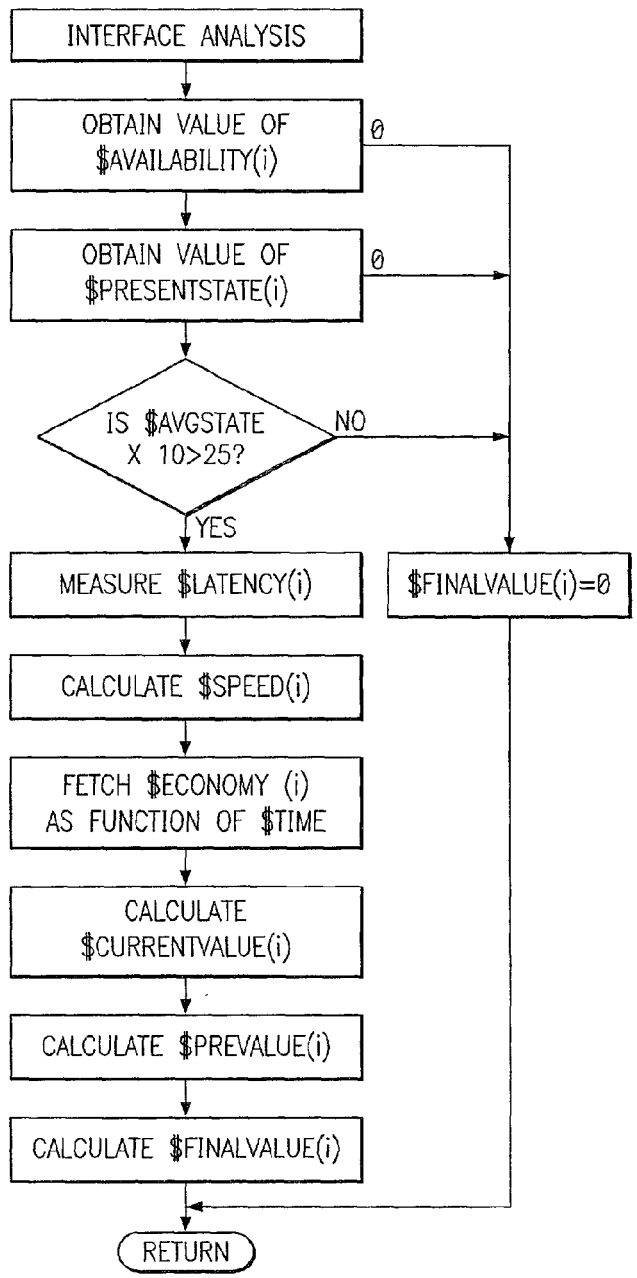
FIG. 3 is a flowchart of the interface analysis subroutine carried out by the present invention.

FIGS. 2 and 3 illustrate flowcharts of the methodology employed by the present invention in arriving at the optimal choice for routing a data file amongst a plurality of available paths in accordance with the present invention. First, as shown in FIG. 2, the fixed user priorities are fetched so that the parameters used in the analysis may be weighted accordingly. The user is then allowed to enter his temporary priority override values for the file transfer. Assuming for this example that no fixed weighting or temporary override values are entered, then the $finalvalue parameter is determined for each of the paths(i) in the switching system 10 in the following manner.

First, with reference to FIG. 3, the routing optimization block 26 checks with memory 22 to determine if that interface (i) has been programmed as being available to be used by that user be observing the variable $availability(i). For example, if the switching system 10 is embodied in a PBX system, then not all users will have access to all paths(i) due to their economic resources. This information is contained in memory 22 and checked as a first step in the process of FIG. 3.

If $availability(i)=0, then $finalvalue(i) is set to zero and the routine is exited. If, however, the interface(i) is available, the $availability(i) is set to 1 and the process proceeds. The routine then checks the to see if the path(i) is operable at that time, and the $presentstate variable is returned from the $interface(i) accordingly. If $presentstate(i)=0 (path inoperable or down), then $finalvalue(i) is set to zero and the routine is exited. If $presentstate(i)=1 (path operable or up), then the routine proceeds.

The variable $avgstate is then checked to ensure that it is greater than a predetermined threshold value, e.g if $avgstate×10>25. If this is true, then the interface(i) is considered to be essentially in operable condition. If false, then the interface(i) is considered to be in essentially non-operable condition, notwithstanding the fact that the $presentstate indicates operability at that particular time.

The routine then proceeds to obtain the $latency(i) value via path analysis block 24. Using $latency(i), the variable $speed(i) is calculated as shown in the flowchart and explained above. The variable $economy(i), which is a function of the $time variable, is obtained from the memory 22. Then, the variable $currentvalue(i) is calculated as a function of $economy(i), $speed(i), and $avgstate(i).

The variable $prevalue(i) is then calculated as a function of the variables $maxbandwidth(i), $reliability(i), and $security (i), which are obtained from the memory 26, as well as $economy(i) which was previously determined. Finally, the variable $finalvalue is obtained as shown in the routine, and this is stored in a register pending calculation of $finalvalue(i) for the remaining interfaces as shown in FIG. 2.

After all the interfaces have been analyzed in the above manner, then the routing optimization block 26 makes a determination as which interface(i) should be selected in accordance with the highest value for $finalvalue(i). The data file is then routed from the memory 30 to the selected interface for transmission.

The routines shown in FIGS. 2 and 3 may be supplemented by the user priority override features described above, which allow the user to specify the fastest route, the least cost rout, the most reliable route, etc.

The measurable parameter $availbandwidth(i) may also be utilized in the algorithms presented herein to provide a real-time indication of the desirability of selecting a particular interface(i) at a given time. Although the fixed parameter $maxbandwidth(i) provides a measure of the maximum bandwidth that may be available for a given interface, the interface can be tested if desired in order to determine what portion of that bandwidth is actually available for use. One test known in the art for accomplishing this measurement is the so-called "show interface serial zero" test, which may be performed by measuring the amount of packets received in the last n seconds as well as how many packets have been transmitted on the interface in that time. Thus, the parameter $availbandwidth may be used instead of, or in conjunction with, the measured parameter $latency to perform the analysis herein.

In addition, while the system and method of the present invention has been shown in conjunction with the transmission of one data file (as defined herein), it may be also applicable to the transmission of multiple data files in either a serial or parallel (interleaved) basis, by modification of the algorithm and routines as may be appropriate.

The choice of particular variables and parameters used herein is the preferred embodiment; it is anticipated that other variables may be used in conjunction with the present invention to arrive at the optimal route in a given situation. In addition, the particular algorithm, while determined to provide a requisite relative weighting of the fixed and measured variables, may also be supplemented in accordance with the requirements of the user in order to arrive at the optimal routing choice.

What is claimed is:

1. In a telecommunications switching system comprising a plurality of interfaces, each of said interfaces interconnected with an associated telecommunications path capable of transferring a data file to a remote destination, each of said telecommunications paths having predetermined parameters associated therewith stored in a memory in said switching system and variable parameters associated therewith, a method of determining which of said plurality of telecommunications paths should be utilized for transferring a data file, said method comprising the steps of:
   a) measuring said variable parameters for each of said paths;
   b) analyzing said measured variable parameters and said predetermined parameters; and
   c) determining which of said paths provides an optimal set of characteristics for transferring the file to the remote destination.

2. The method of claim 1 in which said determining step analyzes a set of programmed user priorities in determining which of said paths provides the optimal set of characteristics for transferring the file to the remote destination.

3. The method of claim 2 in which the user priorities are predefined and stored in said switching system memory.

4. The method of claim 3 in which said predefined user priorities may be changed by said user prior to said analysis step.

5. The method of claim 2 in which the telecommunications path variable parameters comprise a data transfer speed of said path at a given point in time.

6. The method of claim 2 in which said telecommunications path predetermined parameters comprise a cost per unit time of utilizing said path.

7. The method of claim 6 in which said cost per unit time is a function of the current time of day.

8. The method of claim 6 in which said cost per unit time is a function of the current day of week.

9. The method of claim 1 in which said telecommunications path predetermined parameters comprise a measure of data transfer reliability of said path.

10. The method of claim 1 in which said telecommunications path predetermined parameters comprise a measure of data transfer bandwidth of said path.

11. The method of claim 2 further comprising the step of analyzing the size of the file to be sent in relation to said user priorities.

12. The method of claim 1 comprising the additional step of first ascertaining if an interface is available prior to performing said analysis.

13. The method of claim 3 in which each of said predetermined and measured parameters are weighted with respect to said user priorities in performing said analysis step.

14. A telecommunications switching system comprising:
   a) a first memory for holding a data file to be transferred to a remote destination;
   b) a plurality of interfaces coupled with said first memory, each of said interfaces interconnected with an associated telecommunications path capable of transferring the data file to the remote destination;
   c) a second memory for storing predetermined parameters associated with each of said telecommunications paths;
   d) a variable parameter measuring device for measuring the value of a variable parameter associated with each of said telecommunications paths; and
   e) a processor operatively associated with said first and second memories and said variable parameter measuring device for determining which of said plurality of telecommunications paths should be utilized for transferring the data file in accordance with said predetermined telecommunications path parameters and said measured variable parameters.

15. The switching system of claim 14 further comprising a third memory for storing a set of user priorities regarding transmission of the data file, and wherein said processor determines which of said plurality of telecommunications paths should be utilized for transferring the data file in accordance with said user priorities.

16. The switching system of claim 15 further comprising a user interface for allowing a user to change said user priorities in said third memory.

17. The switching system of claim 15 in which said variable parameter measuring device performs a measurement of a data transfer speed of each of said telecommunications paths.

18. The switching system of claim 17 in which said data transfer speed measurement is performed by a ping test.

19. The switching system of claim 15 in which the predetermined parameters stored in said second memory comprise a cost per unit time of utilizing the telecommunications paths.

20. The switching system of claim 19 in which the cost per unit time is a function of the current time of day.

21. The switching system of claim 19 in which the cost per unit time is a function of the current day of week.

22. The switching system of claim 15 in which the predetermined parameters stored in said second memory comprise a measure of data transfer reliability of each of said paths.

23. The switching system of claim 15 in which the predetermined parameters stored in said second memory comprise a measure of data transfer bandwidth of each of said paths.

24. The switching system of claim 15, wherein said processor is configured to ascertain if an interface is available for data file transfer.

* * * * *